United States Patent [19]

Koslow

[11] Patent Number: 4,548,730

[45] Date of Patent: Oct. 22, 1985

[54] PORTABLE SELF-CONTAINED OXYGEN GENERATOR APPARATUS AND METHOD

[75] Inventor: Evan E. Koslow, Westport, Conn.

[73] Assignee: Koslow Technologies Corporation, Westport, Conn.

[21] Appl. No.: 510,612

[22] Filed: Jul. 5, 1983

[51] Int. Cl.[4] .......... A62D 9/00; C01B 15/00; A62B 7/00; A62B 21/00

[52] U.S. Cl. .......... 252/186.43; 252/186.38; 128/202.26

[58] Field of Search .......... 252/186.1, 186.43, 186.38; 423/579, 582; 128/202.26

[56] References Cited

U.S. PATENT DOCUMENTS

| | | | |
|---|---|---|---|
| 3,527,214 | 9/1970 | Rio et al. | 128/191 |
| 3,580,250 | 5/1971 | Oroza | 128/202.26 |
| 3,655,346 | 4/1972 | Cotabish et al. | 423/579 X |
| 3,742,683 | 7/1973 | Sebest et al. | 128/202.26 |
| 3,815,592 | 6/1974 | Staub, Jr. | 128/142 |
| 4,092,264 | 5/1978 | Tsang et al. | 252/186.1 |
| 4,168,706 | 9/1979 | Lovell | 128/205.28 |
| 4,246,229 | 1/1981 | McBride et al. | 422/122 |
| 4,266,539 | 5/1981 | Parker et al. | 128/202.26 |
| 4,314,566 | 2/1982 | Kiwak | 128/204.15 |
| 4,359,048 | 11/1982 | Almasi et al. | 128/205.12 |

FOREIGN PATENT DOCUMENTS

| | | | |
|---|---|---|---|
| 48-20998 | 6/1973 | Japan | 423/579 |
| 57-160902 | 10/1982 | Japan | 423/579 |
| 57-54444 | 11/1982 | Japan | 423/579 |

*Primary Examiner*—Teddy S. Gron
*Assistant Examiner*—Virginia B. Caress
*Attorney, Agent, or Firm*—Prutzman, Kalb, Chilton & Alix

[57] ABSTRACT

An oxygen generator is provided in the form of a housing having isolated first and second chambers. Oxygen-generating material is placed in the first chamber and a catalyst for activating the oxygen-generating material is placed in the second chamber. A heat-absorbing hydrated salt is also provided so as to be present during the reaction to absorb the excessive heat released upon the exothermic chemical decomposition of the oxygen-generating material. The salt has an endothermic dehydration reaction temperature below 50° C. A membrane is operationally connected to the reaction chamber to allow the generated oxygen to be expelled from the reaction chamber while retaining the material contents therein.

6 Claims, 2 Drawing Figures

PORTABLE SELF-CONTAINED OXYGEN GENERATOR APPARATUS AND METHOD

BACKGROUND AND SUMMARY OF THE INVENTION

This invention relates to the exothermic generation of oxygen and more particularly to a portable self-contained oxygen generator apparatus and method of generating oxygen well suited for medical and industrial usage.

Emergency medical oxygen is used extensively to meet the requirements of critically ill or injured persons. Small emergency medical oxygen supplies are common in ambulance, fire, police, and medical emergency operations. Generally, emergency medical oxygen supplies are in the form of small tanks containing oxygen at high pressure. These tanks are relatively expensive since they must be equipped with a precision gas regulator and valves to control the flow and pressure of the oxygen during use. Maintaining sufficient numbers of these tanks is sometimes prohibitive because of their cost. In many cases, the requirements of an actual emergency will overwhelm the available number of oxygen supplies, such as during a fire with a large number of smoke-inhalation victims. Moreover, these devices exhibit significant weight so as to be inconvenient to store and handle, and must be refilled after use.

Notably, emergency medical oxygen supplied from such tanks is often of inferior quality. Such oxygen is commonly too dry and can be too cold when the tank has been stored in a cold place. In hospital respirators, expensive systems are utilized to warm and moisturize the oxygen before providing it to the patient. However, such a conditioning of the oxygen is difficult, if not impossible, to achieve during the use of emergency oxygen supplies due to the size and weight of the equipment required to provide such conditioning.

Portable sources of oxygen are also utilized in athletics and industry. For example, athletic teams in such sports as football often provide on-site oxygen supplies for use by the players. Joggers, athletes, and people performing rigorous exercise also have the need for portable sources of oxygen. The need is also present in a wide variety of other diverse applications such as on trains, planes, and boats to counter motion sickness.

The disadvantages of storage tanks render them unacceptable for many applications and, heretofore, portable oxygen generators have also been unacceptable in many respects. In oxygen generators, oxygen-rich chemicals are decomposed in an exothermic chemical reaction to evolve oxygen. Excess heat produced by the chemical reaction is undesirable and may render the oxygen generator hazardous to operate and may render the oxygen produced unacceptable for medical use. For example, hydrogen peroxide is a common oxygen-rich chemical material. Without some means for removing excess heat, the heat generated by the decomposition of hydrogen peroxide is sufficient to generally discourage the use of a solution of hydrogen peroxide having a concentration greater than 10 percent. A solution of hydrogen peroxide greater than 10 percent, when decomposed, would generate an amount of heat sufficient to seriously overheat the oxygen generator. In addition, the vapor pressure of the hydrogen peroxide would be substantial at these elevated temperatures and would represent a significant toxicological problem. Excessive heating would also result in autocatalytic decomposition of the peroxide and can bring about a dangerous runaway reaction. The excessive temperature would also eventually boil the aqueous solution in the generator and excessively heat the product oxygen which would be uncomfortable or dangerously hot to consume in medical applications and would generate large amounts of steam thereby begetting additional problems. Prior means for removing excess heat, such as a heat exchanger, are not desirable in a portable oxygen generator because of size restrictions and severe cost constraints. Such means for controlling excessive heating would be so costly as to greatly restrict the economic utility of such devices.

Consequently, the heat generated by the exothermic reaction has substantially restricted the use of such oxygen generators for medical and industrial applications where convenient portability is required.

The portable oxygen generator apparatus and method of the present invention overcome these and other problems found in prior portable oxygen supplies by providing an oxygen generator comprising a housing having isolated first and second chambers. A predetermined amount of oxygen-generating material is provided in the first chamber of the unit and a predetermined amount of catalyst for activating the oxygen-generating material is provided in the second chamber. A heat-absorbing chemical material is also provided so as to be present during the reaction to absorb the excessive heat released upon the exothermic chemical decomposition of the oxygen-generating material. An admixing apparatus is selectively actuable for selectively admixing the oxygen-generating material into operative contact with the catalyst in the presence of the heat-absorbing material in one of the chambers, being the reaction chamber. A membrane is operationally connected to the reaction chamber to allow the generated oxygen to be expelled from the reaction chamber while retaining the material contents therein.

The method of producing oxygen in accordance with the present invention includes the steps of providing an oxygen-generating material, a catalyst, and a heat-absorbing material, bringing the catalyst and the oxygen-generating material into operative contact to promote the exothermic generation of oxygen gas in the presence of the chemical heat-absorbing material, whereby the temperature of the reaction is controlled without adversely influencing the production of oxygen. The generated oxygen is isolated from and allowed to pass from the site of the exothermic reaction for subsequent use. The chemical heat-absorbing material is present in an amount sufficient to be effective in absorbing a portion of the excessive heat generated by the exothermic decomposition of the oxygen-generating material.

Accordingly, it is an object of the present invention to provide a light-weight, self-contained, high-capacity oxygen generator with an extended shelf life which provides, upon actuation, a steady regulated flow of warm, conditioned oxygen for medical use.

It is a further object of the invention to provide an oxygen generator which is comprised of chemicals that are easy and safe to store and use.

A still further object of the invention is to provide a method for generating oxygen from decomposable oxygen-rich materials which controls excessive generated heat in an economical space-efficient manner.

Yet another object of the invention is to provide an oxygen generator which is economical to manufacture, economical and simple to use, and safely disposable after use.

Other objects will be in part obvious and in part pointed out more in detail hereinafter.

DESCRIPTION OF THE PREFERRED EMBODIMENTS

Figure 1:
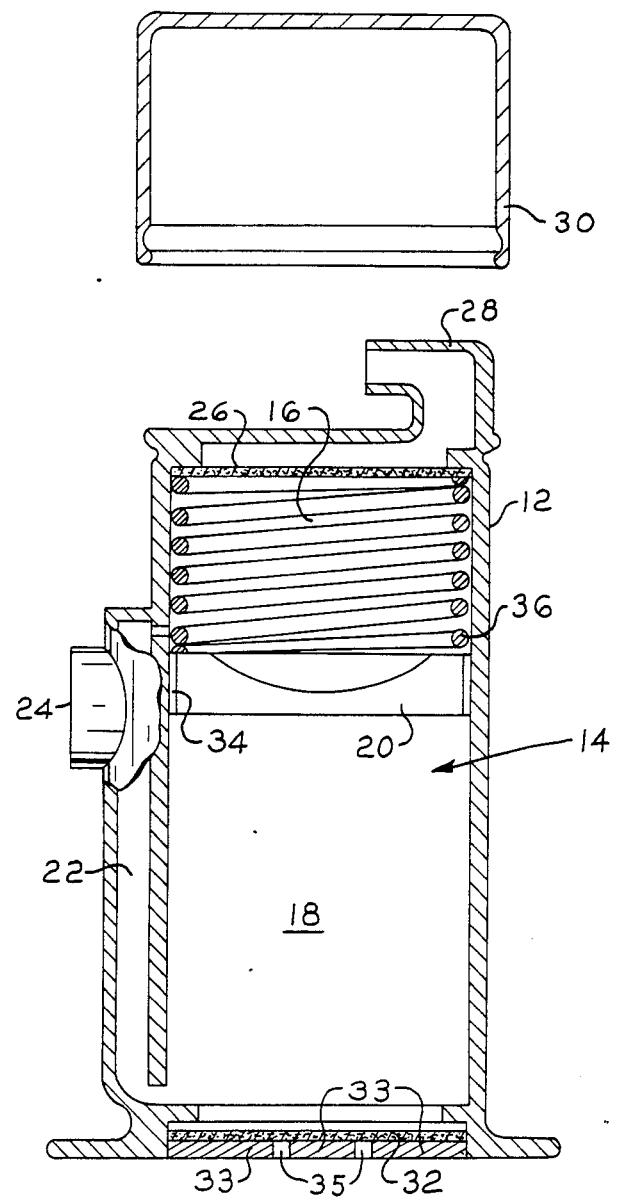
FIG. 1 is a partially diagrammatical sectional view of the oxygen generator apparatus of the present invention.

Referring to the drawings in detail wherein like parts are correspondingly numbered, FIG. 1 shows the oxygen generator apparatus of the present invention. The generator is comprised of a housing 12 forming an interior cylinder 14 which is separated into an upper chamber 16 and a lower chamber 18 by a slidably mounted plunger or diaphragm element 20. The housing 12 exhibits holdable configuration being approximately the size of two 12-ounce soft-drink cans arranged end to end and can be fabricated of injection molded polypropylene or other suitable material. A tube 22 fluidly connects the lower chamber 18 to the upper chamber 16 and is provided with a normally closed control valve 24 to permit regulation of the flow through the tube 22.

At the upper end of the housing 12, a hydrophobic membrane 26 operationally interconnects the upper chamber 16 to a delivery tube 28. As will be explained in detail subsequently, the oxygen gas will pass from the upper chamber 16 through the membrane 26 to the delivery tube 28 for conduction to an apparatus for application, e.g., a mask (not shown). A releasable cap 30 is detachably secured to the housing 12 to protect the delivery tube 28 from dirt and contamination when not in use.

A second hydrophobic membrane 32 is mounted within the lower end of the housing 12 to operationally interconnect the lower chamber 18 with the atmosphere. Similar to the membrane 26, the hydrophobic membrane 32 functions to easily pass gas but retain liquids and will allow any excess oxygen formed during storage of the oxygen generator to be vented to the atmosphere without loss of liquid. A support substrate 33 with drainage ports 35 is mounted adjacent the membrane 32.

The plunger 20 is slidably mounted within a lubricated seal or flange 34 in the cylinder 14 so that the plunger 20 is slidable along the length of the cylinder 14. A compression spring 36 is mounted within the upper chamber 16 between the membrane 26 and the plunger 20 to urge the plunger 20 in a downward direction toward the lower chamber 18. Consequently, the plunger 20 is biased downwardly toward the lower chamber 18 to apply a pressure upon any liquid within the lower chamber 18. The pressure applied by the plunger 20 on the liquid within the lower chamber 18 will force the liquid up through the tube 22 and into the upper chamber 16 upon actuation of the control valve 24. Thus, an actuable subassembly is provided for selectively admixing or conducting the liquid within the lower chamber 18 to the upper chamber 16. Other alternative methods can be utilized for selectively admixing or conducting the liquid from the lower chamber 18 to the upper chamber 16 including the use of vacuum techniques to pressurize the liquid in chamber 18.

The hydrophobic membrane 26 operationally interconnects the delivery tube 28 and the upper chamber 16 and functions to allow passage of the oxygen gas from the upper chamber 16 to the delivery tube 28 while restraining liquids within the upper chamber 16. The membrane 26 also functions to purify the evolved oxygen by filtering out contaminating bacteria, particulate matter and free aerosolized water. Importantly, the membrane 26 prevents any water aerosols carrying hydrogen peroxide from passing from the generator to the patient.

The design of the membranes is based upon regulating the size of the pores within the fabric of the membrane and the use of a hydrophobic filter medium that tends to reject fluids but easily passes gaseous components. The pores must be small enough to prevent the passage of liquid even at the highest pressure differential expected but must be large enough to allow the desired gas flow to occur within the range of allowed differential pressures across the membrane. Thus, there must be a balance between the size of the pores required to retain liquid and the size and number of pores required to obtained the desired flow of oxygen therethrough.

The pressure required to pass a fluid through a pore by capillary force is:

$$P = 2S(\cos\theta)/r$$

where S is the surface tension of the fluid, $\theta$ is the fluid and membrane contact angle, and r is the radius of the pore. A wettable membrane having pores with a diameter of 16 micrometers would be sufficient to retain pure water under a pressure of 0.1 atmosphere. Modifying the membrane to provide a contact angle of 70 degrees would allow the membrane to contain pores having a diameter of 50 micrometers. For adequate safety, pores of less than 10 micrometers in diameter on a nonwettable membrane are desired.

Gas flow, Q, through the pores of the membrane, of radius r, and at a differential pressure of P, is described by:

$$Q = r^4 P/8vL$$

which describes the flow of gas through a single pore when the length of the pore is L, and where the viscosity of the gas is v. The number of pores in a given membrane is:

$$N = F(R_m^2/r^2)$$

where F is the fraction of open space and $R_m$ is the radius of a round membrane section.

Total gas flow through a given membrane disc of radius $R_m$, or area $R_m$, is:

$$QN = r^2 PFR_m^2/8vL$$

Based upon this equation and testing, it has been found that membranes having pores that are 2–10 micrometers in diameter and having a total surface area of at least 20 cm² can easily pass 20 liters of gas/minute. In the illustrated embodiment, the membranes 26, 32 are glass fiber membranes either unsupported or supported on a coarse cellulose-fiber substrate, impregnated with silicon and/or tetrafluoroethylene resins to impart hydrophobicity, and having a pore size of approximately 5 micrometers.

To load the oxygen generator for eventual actuation, the lower chamber 18 is filled with a solution of an oxygen-generating solution which may also contain some of the heat-absorbing material. The upper chamber 16, in turn, is filled with a solution of the heat-absorbing material at an appropriate concentration together with a nucleating agent and a solid catalyst that promotes the rapid decomposition and release of oxygen by the material in the lower chamber when it is brought into contact with the catalyst. The catalyst can be supported on the walls of the chamber 16 or on a porous support medium (not shown) or can be added as a solid powder or liquid. Additional chemicals may be added to enhance or control the performace of the heat-absorbing material, to reduce foaming, etc.

In this deactivated or storage mode, the drive spring 36 is compressed or loaded and the reactants are separated by the movable plunger 20 which also maintains the lower chamber 18 under pressure due to the biasing force of the spring 36. The valve 24 is normally closed to prevent communication between the upper and lower chambers. In this mode, the oxygen generator can be stored and is ready for use upon actuation of the control valve 24. With stabilizers, a storage life of at least five years can be expected.

In operation, the control valve 24 is opened to actuate the oxygen generator to produce oxygen gas. Upon opening the valve 24, the solution in the lower chamber 18 is caused to flow up the tube 22 due to the pressure applied by the spring 36 through the plunger 20. The solution flows into operative contact with the catalyst contained in the upper chamber 16 and the reaction commences. The control valve 24 can be adjusted to provide a selectable steady flow rate into the upper chamber 16 or to provide an intermittent burst.

When the heat generated by the oxygen-producing reaction within the upper chamber 16 causes the temperature of this chamber to rise above a predetermined critical value, for example, approximately 30° C., the heat will start to be absorbed by the heat-absorbing material, due to the endothermic nature of that material, to maintain the upper chamber at an acceptable operating temperature. Further buffering of the temperature is provided by the heat capacity of the chemicals and the liquid as well as through the dissipation of heat by convection and conduction through the walls of the housing.

The evolved oxygen gas passes through the hydrophobic membrane 26 to the delivery tube 28 for distribution to the user. The hydrophobic membrane 26 functions to allow passage of the oxygen gas therethrough but restrains the passage of liquid. In this manner, the oxygen gas is purified for use for medical purposes.

As the oxygen gas is evolved, the oxygen-generating solution continues to be moved from the lower chamber 18 to the upper chamber 16 by the displacement of the plunger 20. The control valve 24 is adjustable to allow the user to vary the rate of oxygen gas evolution over a wide range. In the illustrated configuration, the oxygen generator can produce a total of about 55 liters of oxygen. The medical use of oxygen usually specifies a flow rate of 2-6 liters of oxygen per minute and, under normal conditions, the oxygen generator of the illustrated embodiment is sufficient for 10-25 minutes. Since the chemical components are aseptic, the generated oxygen is sterile in addition to being filtered or purified by the hydrophobic membrane. Accordingly, the oxygen generator is of relatively high capacity for its compact, lightweight size (i.e., 3 lbs.) and produces warm, sterile, and pure oxygen for medical applications. Upon exhaustion of the chemical reactants, the container and residue components are safely disposable.

Figure 2:
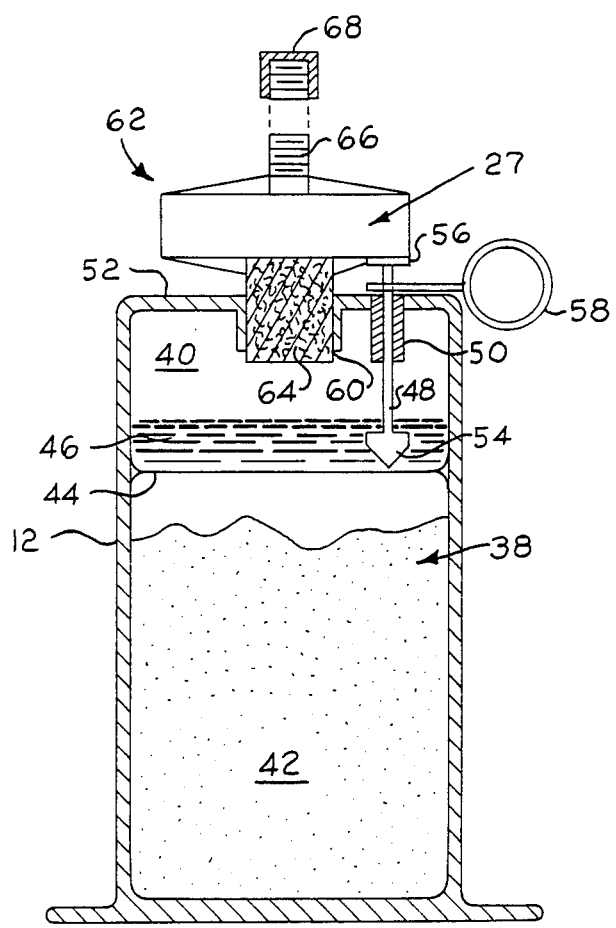
FIG. 2 is a view similiar to FIG. 1 of an alternative embodiment of the oxygen generator apparatus of the present invention.

Referring to FIG. 2, an alternative embodiment of the oxygen generator apparatus of this invention is shown wherein like numerals are used to designate the same or like parts. In this embodiment, the housing 12 forms an internal cavity 38 having an upper end portion 40 and a lower end portion 42. The lower end portion or lower chamber 42 contains a dry powder mixture of a decomposable oxygen-generating chemical and a heat-absorbing material. A rupturable pouch 44 is mounted in the upper end portion 40 of cavity 38. The pouch 44 contains a liquid 46 having a catalyst to promote the decomposition of the oxygen-generating material in the lower end portion 42. The oxygen-generating material is thus separated from the catalyst solution by the rupturable pouch 44.

A striker element 48 is slidably mounted within a guide sleeve 50 extending through the upper end 52 of the housing 12. The striker element 48 has a pointed end 54 adjacent the pouch 44 and a handle portion 56 extending above the upper end 52 of the housing 12. The depression of the handle end 56 will thus slidably displace the striker element 48 downwardly to cause the pointed end 54 to rupture the pouch 44. To prevent an unintended depression of handle 56, a safety ring 58 locks the striker 48 in a withdrawn position. The safety ring 58 is removed by a simple pulling action to allow subsequent actuation of the striker element 48.

The upper end 52 of the housing 12 contains an outlet orifice 60 in communication with the cavity 38. A filter plug assembly 62 is mounted within orifice 60 and comprises a packed bed of stainless steel mesh 64 coated with silicon oil to provide a foam breaker. An alternative respiratory therapy filter or hydrophobic membrane (not shown) is mounted adjacent the foam breaker within the plug assembly 62 and functions in substantially the same manner as discussed hereinbefore in connection with membrane 26. An acceptable respiratory therapy filter is manufactured by Pall Corporation of Glen Cove, Long Island, N.Y. A delivery tube 66 is located at the top of the filter plug 62 and is covered by a removable cap 68. During storage of the oxygen generator, the cap 68 maintains the delivery tube 66 in a clean condition.

To actuate the oxygen generator, the cap 68 is removed from delivery tube 66 and the safety ring 58 is removed from the striker element 48. The handle 56 of the striker element 48 is depressed to rupture the pouch 44. Upon rupture, the catalytic solution contained in the pouch 44 is intermixed with the oxygen-generating material in the presence of the chemical heat-absorbing material. As previously described with respect to the embodiment of FIG. 1, the catalyst promotes an exothermic decomposition of the oxygen-generating material to evolve oxygen gas and as the reaction temperature reaches a predetermined value, the chemical heat-absorbing material endothermically absorbs the excess heat to maintain a stable and acceptable operating temperature. The evolved oxygen gas passes through the hydrophobic membrane and outward to the delivery tube 66 while the foam breaker 64 prevents the passage of any foam caused by the chemical reaction.

Other acceptable containers for the catalytic solution may be utilized as well as alternative means for selectively rupturing the container. For example, the pouch 44 can be pressurized as well as the interior of housing 12. When the housing 12 is opened to the atmosphere, the pressure is released so that the pouch expands and bursts to cause the catalytic solution to intermix with the oxygen-generating material.

As mentioned hereinbefore, the method of the present invention provides for the generation of oxygen only at the time it is needed through the utilization of an oxygen-generating composition which, in the presence of an appropriate catalyst, will provide a controlled release of oxygen gas. The composition not only produces the oxygen gas but, at the same time, controls the heat generated by the oxygen-releasing reaction and obviates the hazard associated with excessive heat generation within the container. In accordance with this system, the oxygen is produced by the exothermic decomposition of the chemical oxygen-rich composition while the excessive heat produced thereby is absorbed by an appropriate heat-absorbing material present within the vicinity of the reaction site.

As can be appreciated, a number of different oxygen-rich or oxygen-generating materials may be utilized as the source of the desired oxygen gas. Many of these materials such as the peroxides and chlorates are well known and this invention should not be unduly restricted to a specific type of material. However, it is generally preferred that the oxygen-generating material be capable of producing the highest possible amount of free oxygen relative to the weight and volume of the initial oxygen-producing material. Accordingly, it is generally preferred that the percent, by weight, of free oxygen released by the material should be greater than five percent and preferrably should be greater than ten percent, keeping in mind the necessity to balance the oxygen-generating capability of the material against the handling and storage characteristics thereof. For example, although alkaline superoxides and peroxides or strong solutions of hydrogen peroxide may be used in accordance with the present invention, such materials are highly caustic and frequently require great care due to their toxic and hazardous nature. Other materials which may be employed, such as barium peroxide or potassium permanganate are far more expensive and although they may be employed, their costs tends to be prohibitive. Still others, such as sodium persulfate, contain a low level of oxygen gas-generating potential and therefore are less desirable in a system of the type described in this invention. When seeking a balance of the various factors involved, it has been found that the preferred material should be relatively safe and stable during handling. Materials of this type include peroxide hydrated salts, such as potassium percarbonate, which has been used in laundry bleach formulations and contains about 13 percent free oxygen. This material also advantageously provides release of the oxygen in a controlled manner over a brief period of time. Such materials are particularly beneficial when the oxygen supply is to be used for medical purposes. However, where industrial application is envisioned, other materials may be employed.

As mentioned, the utilization of materials such as peroxides results in the production of excessive amounts of heat and it is necessary during the reaction to control the temperature level at the reaction site to avoid autocatalytic acceleration of the reaction rate. This is achieved in accordance with the present invention by stabilizing the exothermic reaction through intimate admixture therewith of a heat-absorbing material that prevents the reaction temperature from exceeding an established limit. This is achieved without seriously reducing the oxygen-generating capability of the system. In this manner, the production of the oxygen gas and the absorption of the excess heat generated thereby is carried out substantially simultaneously. Accordingly, a proper balancing of the appropriate mixture of oxygen-generating and heat-absorbing materials can result in the reliable maintenance of a constant temperature throughout the course of the oxygen gas producing reaction.

As will be appreciated, several materials will exhibit the necessary endothermic characteristics whereby heat will be absorbed by the material without interfering with the generation of oxygen. For systems of the type described herein it has been found that salts which undergo reversible dehydration are particularly useful. These highly hydrated salts will absorb the excess heat generated by the oxygen-producing reaction. Other materials that may be used are those which undergo endothermic phase transitions or chemical transformations as the result of heat absorption. For example, certain salts having significant heats of solution could be used. While the choice of the appropriate heat-absorbing component depends upon the desired temperature and the quantity of energy absorbed per unit of chemical utilized, the temperature at which the heat-absorbing component is most effective is an important consideration. Accordingly, it is generally preferred that the material exhibit an endothermic reaction at a temperature below 50° C. Where the gas is to be utilized for medical purposes the temperature of the gas at the point of use should not substantially exceed 30° C. to insure full comfort by the user.

In the system of the present invention, the preferred energy-absorbing materials are hydrated salts which exhibit a dehydration temperature of about 30°-50° C. Materials of this type include alkaline sulfates, thiosulphates and biphosphates. However, the preferred material for use as the heat-absorbing compound in the present invention combines both a high endothermic heat of reaction with a low dehydration temperature. These conditions are met by sodium sulfate decahydrate and sodium biphosphate.

It is a feature of the present invention that both the oxygen producing material and the energy-absorbing material may take the form of either a solid or may be stored as an aqueous solution. Additionally, as mentioned, the energy-absorbing material may be admixed with the oxygen-producing material prior to the reaction or the materials may be partially separated and only brought into intimate engagement at the time of reaction. Thus, the composition of the present invention provides a high degree of flexibility with respect to the design of the oxygen-generating structure and the manner of its operation. As can be appreciated, where the energy-absorbing material is initially admixed with the oxygen-generating compound of the system, it is preferred that the energy-absorbing material also be present at the reaction site if this site is remote from the storage location for the oxygen-generating material. Also it is preferred that the amount of energy-absorbing material be greatest at the reaction site in order to insure appropriate energy absorption at the time of reaction.

The specific amounts of energy-absorbing compounds employed may vary with the specific oxygen-generating material employed. Generally, the ratio of energy absorber to oxygen generator will fall within the range of 1:2 to 2:1 with the preferred composition having equal amounts of the two materials. Where a portion of the energy-absorbing material initially is placed within the compartment containing the catalyst, the mix of absorber and oxygen generator falls within the lower portion of the foregoing ratio range.

By way of example, it may be noted that when a solution of the oxygen generator is utilized as the source of the oxygen gas, the energy-absorbing material, such as the sodium sulfate decahydrate, should be present at a concentration of about 500 grams per liter while at the reaction site, the energy-absorbing material should exhibit a concentration which is approximately twice that concentration prior to admixture at the reaction site. Additionally, small amounts of nucleating agents such as borax may also be included within the solution located within the reaction chamber. Typically, amounts on the order of 0.1 percent by weight are employed.

Thus it can be seen that a lightweight, self-contained, high-capacity generator with an extended shelf life is disclosed which provides a steady regulated flow of warm, moist, sterile oxygen for a variety of medical and industrial applications. The oxygen generator is composed of chemical components that are nontoxic and safe for storage, use, and disposal. Importantly, the oxygen generator is economical to manufacture and simple to use. As will be apparent to persons skilled in the art, various modifications and adaptations of the structure and method described above will become readily apparent without departure from the spirit and scope of the invention, the scope of which is defined in the appended claims.

I claim:

1. A formulation for the temperature controlled production of oxygen for medical use comprising an intimate mixture of an oxygen-generating peroxy material and a heat-absorbing hydrated salt having an endothermic dehydration reaction temperature below 50° C., the weight ratio of the oxygen-generating material to the heat-absorbing hydrated salt falling within the range of about 1:2 to 2:1.

2. The formulation of claim 1 wherein the oxygen-generating material is a percarbonate salt.

3. The formulation of claim 1 wherein the heat-absorbing hydrated salt is selected from the group consisting of alkaline sulfates, thiosulfates and biphosphates.

4. The formulation of claim 3 wherein the heat-absorbing hydrated salt is sodium sulfate decahydrate.

5. The formulation of claim 1 wherein the weight ratio of oxygen-generating material to heat-absorbing hydrated salt is about 1:1.

6. The formulation of claim 1 including a minor amount of borax as a nucleating material.

* * * * *